United States Patent [19]

Bopp

[11] Patent Number: 4,591,037
[45] Date of Patent: * May 27, 1986

[54] ROTARY MAGNETIC CONTROL FOR A VISCOUS FLUID COUPLING

[75] Inventor: Warren G. Bopp, Farmington Hills, Mich.

[73] Assignee: Eaton Corporation, Cleveland, Ohio

[*] Notice: The portion of the term of this patent subsequent to Aug. 31, 1999 has been disclaimed.

[21] Appl. No.: 565,958

[22] Filed: Dec. 27, 1983

Related U.S. Application Data

[63] Continuation of Ser. No. 327,007, Dec. 3, 1981, Pat. No. 4,458,798.

[51] Int. Cl.⁴ .................. F16D 35/00; F16D 43/25
[52] U.S. Cl. ................... 192/58 B; 192/82 T; 251/129.15
[58] Field of Search ............ 192/58 B, 82 T; 251/141

[56] References Cited

U.S. PATENT DOCUMENTS

| | | | |
|---|---|---|---|
| 2,658,400 | 11/1953 | Dodge | 74/230 |
| 2,974,768 | 3/1961 | Hause | 192/82 |
| 3,559,786 | 2/1971 | Long | 192/58 |
| 3,968,866 | 7/1976 | Leichliter et al. | 192/58 |
| 3,972,399 | 8/1976 | Bopp | 192/58 |
| 4,056,178 | 11/1977 | Detty | 192/58 |
| 4,064,980 | 12/1977 | Tinholt | 192/58 |
| 4,346,797 | 8/1982 | Bopp | 192/58 B |
| 4,362,226 | 12/1982 | Gee | 192/58 B |
| 4,458,798 | 7/1984 | Bopp | 192/58 B |

Primary Examiner—Rodney H. Bonck
Assistant Examiner—Alan G. Towner
Attorney, Agent, or Firm—J. G. Lewis; C. H. Grace

[57] ABSTRACT

A viscous fan clutch (10) is typically employed in a fan drive mechanism within a truck or automobile. A shaft (12) driven by the engine, rotates a clutch member (24) within the fan drive. The clutch member is arranged for fluid engagement with a body member (42) for the transmission of torque thereto when the fluid is disposed in an operating chamber (70) defined by complimentary shear surfaces (30 and 56) in the clutch and body members. During relative rotation between the two members, fluid is pumped from the operating chamber to a storage chamber (76) through a return passage (111). Fluid is returned to the operating chamber via bleed ports (118). The return passage and bleed ports are selectively restricted by an electromagnetically controlled valve (112) which taps the kinetic energy of the rotating members. A control system (132) senses vehicle coolant temperature and actuates the valve as a function thereof.

18 Claims, 3 Drawing Figures

ROTARY MAGNETIC CONTROL FOR A VISCOUS FLUID COUPLING

This is a continuation of application Ser. No. 327,007, filed Dec. 3, 1981, and now U.S. Pat. No. 4,458,798.

INTRODUCTION

The present invention relates to viscous fluid couplings, and more particularly to such couplings which are turned "on" or "off" as a function of the temperature of an associated fluid. More particularly still, the present invention relates to viscous fluid couplings which are employed as vehicle fan drives and which are actuated as a function of coolant temperature.

CROSS REFERENCE

The subject matter of this application represents an improvement to that of U.S. application Ser. No. 172,320, filed July 25, 1980, now U.S. Pat. No. 4,346,797 and is related to that of U.S. application Ser. No. 681,106, filed Apr. 28, 1976, now U.S. Pat. No. 4,056,178, issued Nov. 1, 1977; and U.S. application Ser. No. 020,282, filed Mar. 14, 1979, now U.S. Pat. No. Re. 30,428.

BACKGROUND OF THE INVENTION

Viscous fluid couplings have received wide acceptance in the automotive industry for controlling the amount of torque transmitted to a radiator cooling fan. The most common form of such viscous fluid couplings is the air temperature response type such as illustrated in U.S. Pat. No. 3,055,473. In certain applications, however, it has become desirable to directly sense the engine cooling water temperature rather than temperature of the air passing through the radiator. To date, many arrangements have been proposed to accomplish this result. Typically, these arrangements have made use of wet or dry plate clutches that are pneumatically actuated or electromagnetic clutches that are electrically actuated. A major shortcoming of many prior art magnetically actuated clutches or couplings resides in the fact that relatively high torque levels are involved. These high torque levels require relatively massive engagement mechanisms which must be engaged through the action of relatively intense magnetic fields set up by large and expensive inductors. Such inductors draw substantial amounts of energy from the associated vehicle's electrical system and thus reduce overall operational efficiency. Additionally, such devices typically employ relatively large springs which bias a portion of the engagement mechanism toward either the engaging or nonengaging position. Accordingly, the magnetic field must also overcome the force of the biasing spring as well as the mass of the engagement mechanism.

More recently, improved prior art electromechanically actuated viscous fluid couplings having been suggested which employ inductors to establish magnetic fields which actuate valves controlling the flow of viscous fluid within the clutch. This arrangement represents an improvement inasmuch as the magnetic field established by the inductor only has to be large enough to move a relatively small valving arm and biasing spring. Although representing an improvement, such devices have inherent inefficiencies inasmuch as their valving arm biasing springs have to be large enough to overcome the kinetic energy of the viscous fluid flowing therein.

It will be apparent from a reading of the specification that the present invention may be advantageously utilized with fluid couplings intended for many different applications. However, the invention is especially useful when applied to a viscous coupling or clutch which serves as a drive for a radiator cooling fan of a vehicle engine, and will be described in connection therewith.

BRIEF DESCRIPTION OF THE INVENTION

The present invention finds particular application in a viscous fluid clutch of the type including first and second clutch members mounted for relative rotation about a common axis and defining cooperating shear surfaces which operate to transmit torque when a flow of viscous fluid is established therebetween. According to the invention, and by way of overcoming the above described shortcomings of viscous fluid clutches, the viscous fluid clutch is provided with a valving element which is mounted for rotation with one of the members and is operable to frictionally engage the other member to modulate the return flow of fluid as it passes from the operating chamber to the fluid storage chamber through a return passageway. This arrangement permits enhanced control of the clutch with the exercise of a relatively small amount of externally applied energy by tapping the kinetic energy of one of the rotating members.

The preferred embodiment of the invention finds particular application in a motor vehicle viscous fluid clutch of the type which includes a first clutch member fixed on a shaft for rotation therewith, and a second clutch member supported by the shaft for rotation thereabout and having shear surfaces which coact with complimentary shear surfaces on the first member to define an operating chamber therebetween. A fluid storage chamber is located near the operating chamber and a pump provides a circulating flow of viscous fluid between the chambers. According to the preferred embodiment of the invention, a valving element is mounted coaxially with the second member for rotation therewith which is axially displaceable to frictionally engage the shaft to effect modulation of the flow of fluid through the return passageway interconnecting the output with the fluid storage chamber by angular displacement of the element from a first limit of travel in which the passageway is relatively unobstructed to a second limit of travel in which the passageway is substantially closed.

According to another aspect of the invention, actuator means such as an electromagnet is provided which operates to displace the valving element from a first nonengaging position to a second position to effect the frictional engagement. This arrangement provides the advantage of an external noncontacting actuating mechanism which can be easily controlled such as by use of a vehicle fluid temperature sensing transducer.

According to another aspect of the invention, biasing means such as a spring is provided to urge the valving element axially into its first position. This arrangement provides the advantage of the utilization of a relatively small spring and commensurate electromagnet inductor current.

According to another aspect of the invention, another spring or biasing means is provided to angularly or rotationally urge the valving element into its first limit of travel where the return passageway is unobstructed. This arrangement, in combination with the biasing means for urging the valving element axially into its first position, has collective advantage of providing a relatively large spring to resist the rotational displacement of the valving element under the influence of frictional engagement with the shaft, as well as a relatively small spring which axially urges the valving element into its first position against the influence of the electromagnet actuator, whereby a relatively small control current can precisely and dependably control a relatively large viscous clutch.

According to another aspect of the invention, means are provided to compensate for slight skewing or angular misalignment of the clutch members. This arrangement provides a control system for a viscous fluid clutch which will operate effectively even under conditions of broad design tolerances, misalignment in manufacturing or wear during use.

Various other features and advantages of this invention will become apparent upon reading the following specification, which, along with the drawings, describes and discloses a preferred embodiment of the invention in detail.

The detailed description of the specific embodiment makes reference to the accompanying drawings.

DETAILED DESCRIPTION OF THE SPECIFIC AND ALTERNATIVE EMBODIMENTS

Figure 1:
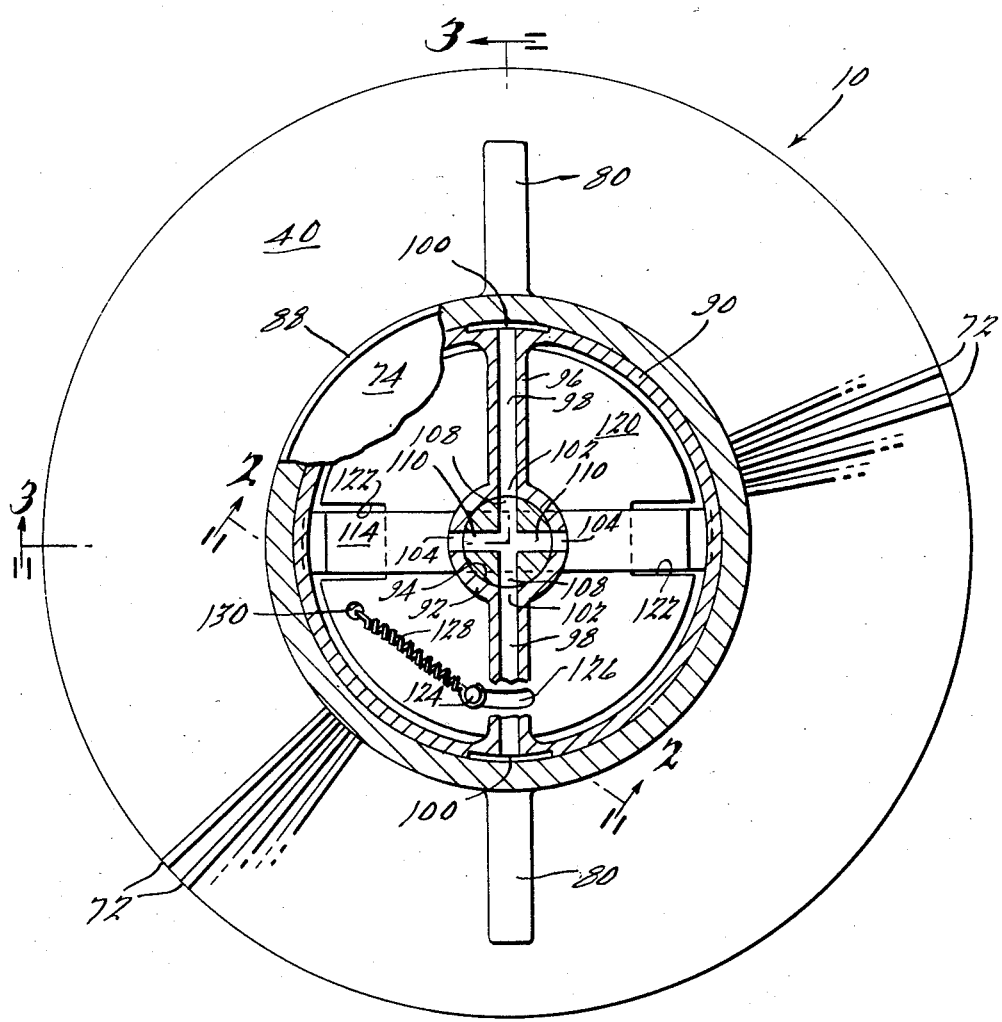
FIG. 1, is a front plan view of the preferred embodiment of the invention with the front cover plate broken away.

Referring to the drawing figures, the preferred embodiment of a viscous fluid clutch 10 is illustrated. Clutch 10 comprises a driving or input shaft 12 including an integral shaft flange 14. Flange 14 defines a number of circumferentially spaced apertures 16 which accommodate bolts 17 for mounting clutch 10 to a driven shaft (not shown) such is that of an automobile engine coolant pump which is driven by a pulley and V-belt as is well known in the art. Driving shaft 12 is provided with a reduced intermediate portion 18 which functions as an inner race supporting surface for a ball bearing assembly 20. A shoulder 22 formed on shaft 12 restrains bearing 20 in one axial direction.

A clutch member 24 is provided with a hub portion 26 and a plate portion 28 having a plurality of concentric annular coupling lands 30 formed on the front side thereof. Hub portion 26 is provided with a straight wall opening 32 which has an interference fit with a second reduced intermediate portion 27 of shaft 12 so that clutch member 24 rotates with and is axially retained on shaft 12. Hub portion 26 is pressed onto shaft portion 27 until it abuts the inner race of bearing 20 to confine bearing 20 in the other direction of axial movement. Clutch member 24 is further retained to shaft 12 by a retaining ring 34 disposed in a circumferential slot 35 within shaft 12. Several breathing apertures 36 are formed in clutch member 24 at the point of transistion between hub portion 26 and plate portion 28.

A cover assembly 38 comprising a cover member 40 and a body member 42 is mounted for rotation on shaft 12. Body 42 includes a hub 44 which is supported on the lateral surface of the outer race of bearing assembly 20 and is disposed in an interference fit therewith. Two shoulder portions 46 and 47 of hub 44 react against both end surfaces of the outer race of bearing assembly 20 and limit movement of body 42 in both axial directions.

The end of shaft 12 distal flange 14 terminates in a reduced end portion 48 which functions as an inner race supporting surface for a roller bearing assembly 50. Cover 40 includes a hub 52 and a plate portion 54 having a plurality of concentric annular coupling lands 56 on the back side thereof. Hub 52 is supported on the lateral surface of the outer race of bearing assembly 50 and is disposed in an interference fit therewith. Body 42 and cover 40 are thereby free to rotate about shaft 12 on bearing assemblies 20 and 50. Cover 40 is affixed to body 42 by means of a shoulder portion 43 which circumferentially embraces the radially outwardmost edge of body 42. Shoulder portion 43 is preferably formed by swedging or otherwise locally deforming cover 40. A plurality of fan blades 58 are secured at the shank portion thereof by studs, nuts and lockwashers 60 at a radially intermediate portion of body 42. An elastomeric seal 62 resides in an annular channel 64 in the radially outward most portion of body 42 which abuts cover 40.

Cover 40 is provided with an annular recess 66 formed in the face thereof on the side adjacent lands 30. A pair of diametrically opposed axially directed holes 68 are disposed slightly radially outwardly of annular lands 56 within cover 40 and communicate with recess 66. Annular lands 56 and 30 as well as the adjoining grooved portions of body 42 and cover 40 constitute shear surfaces and define an operating chamber, generally designated 70, which operates such as described in U.S. Pat. No. 4,056,178, the specification of which is incorporated herein by reference. Annular lands 30 terminate or are alternately cut away in the form of a V-notch to form three equally spaced radially directed channels. The structure defines a known fluid path commencing with the area adjacent lands 30 and 56, the radial channels, axially directed holes 68 and annular recess 66.

Cooling fins 72 are integrally formed in cover 40 adjacent fan blades 58. Cooling fins 72 are arranged to provide additional cooling area and dissipate heat which is generated in clutch 10.

The radially innermost portion of the outside surface of cover 40 coacts with a cover plate 74 to define a fluid storage chamber, designated at 76. The end of shaft 12 distal flange 14 passes through roller bearing assembly 50 as well as a straight wall opening 51 in hub 52 of cover 40, and terminates within fluid storage chamber 76. The material of cover 40 proximate the peripheral edge of cover plate 74 forms a shoulder portion 88 which is locally deformed such as by swedging to retain plate 74. An elastomeric seal 75 resides in an annular channel 77 in the leftward most surface of cover 40 (adjacently radially outwardly or chamber 76) which abuts cover plate 74.

Two diametrically opposed radially directed return passage apertures 78 interconnect holes 68 with substantially annular fluid storage chamber 76. Apertures 78 pass through associated areas of increased wall thickness 80 within cover 40. The radially outwardmost ends of return passage apertures 78 are sealed with an interference fit ball 82, or other suitable material. The end of shaft 12 distal flange 14 defines a plane normal to the axis of rotation (designated A—A) of clutch 10. A plastic bearing insert 84 is disposed within a recess 86 within the end of shaft 12 distal flange 14. The lefthand most (as viewed in FIG. 3) coterminous surfaces of shaft 12 and insert 84 constitute a first thrust or friction surface.

Cover plate 74 includes a rightwardly extending (as viewed in FIG. 3) flange 90 integrally formed therewith. Flange 90 circumferentially encompasses and encloses fluid storage chamber 76 in conjunction with the radially inward left hand most surface of cover 40. Cover plate 74 also defines a second annular flange 92, disposed concentrically with flange 90 about axis A—A and extending rightwardly into fluid storage chamber 76. Flange 92 defines a valve member receiving cavity 94 which opens rightwardly within fluid storage chamber 76. Cover plate 74 also integrally defines two circumferentially opposed radially directed areas of increased wall thickness 96 which, in turn, define two circumferentially opposed radially inwardly directed viscous fluid return passageways 98. Return passageways 98 communicate radially outwardly with a recess 100 locally formed in the outer circumferential surface of flange 90. Apertures 78 likewise communicate with recess 100 at the radially inward most extent thereof. The radially inward most end of passageways 98 communicate with valve member receiving cavity 94 through circumferentially opposed radially directed apertures 102 in flange 92. Two circumferentilly opposed radially directed drain ports 104 provide fluid communication between valve member receiving cavity 94 and fluid storage chamber 76. A puck-shaped valve member 106 is nestingly disposed within cavity 94 and is restrained from radial displacement by flange 92. Valve member 106 has two radially directed intersecting bores 108 and 110 extending therethrough normal to one another. When valve member 106 is in the position illustrated, bore 108 is in register with apertures 102 and return passageways 98. Bore 110 is in register with drain ports 104. Thus, in the position illustrated, an unobstructed fluid path exists comprising hole 68, return passage aperture 78, recess 100, aperture 102, bores 108 and 110, and drain port 104 into fluid storage chamber 76. Definitionally, this path is denoted as a viscous fluid return passageway, indicated generally at 111.

Figure 3:
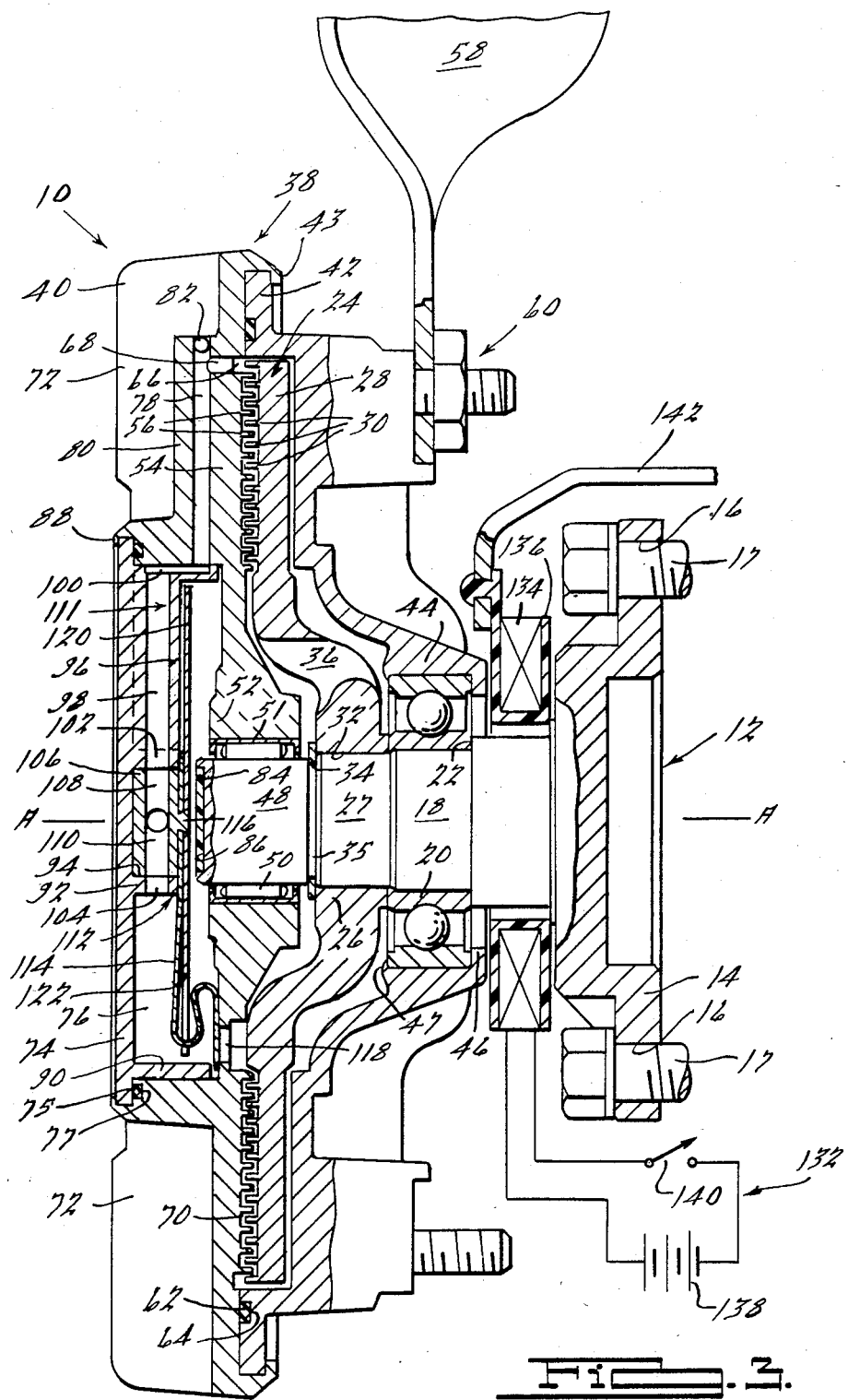
FIG. 3, is a cross-sectional view on an enlarged scale taken on line 3—3 of FIG. 1.

Valve member 106 is rotationally repositionable within cavity 94 as will be described in detail hereinbelow. In addition, valve member 106 is axially displaceable rightwardly as illustrated in FIG. 3. Definitionally, in its illustrated position, valve member 106 is in its rotational first limit of travel and its axial first (lefthand most) position.

A valving element assembly, generally designated 112 is disposed within fluid storage chamber 76 and comprises valve member 106, and an elongated valve blade 114 which is supported on valve member 106 by a staked keyed boss 116. The ends of blade 114 terminate in serpentine fashion with the end most portions overlaying relatively large diametrically opposed drain ports 118 which are disposed within cover 40 near the radially outward most extent of fluid storage chamber 76 to provide fluid communication between operating chamber 70 and fluid storage chamber 76. The serpentine nature of valve blade 114 causes its ends to self-bias themselves against the surface of cover 40 immediately surrounding drain ports 118. Accordingly, as illustrated in FIG. 3, valve blade 114 is pressing rightwardly against the lefthand most surface of cover 40 within fluid storage chamber 76 to effectively restrict or seal the passageway between chambers 70 and 76 established by ports 118. Boss 116 of valve member 106 also supports a circular plate 120 which is of slightly smaller diameter than fluid storage chamber 76 and which includes two diametrically spaced radially inwardly directed slots 122 which are of a dimension slightly wider than the width of valve blade 114 and are aligned therewith. Boss 116, being keyed to both valve blade 114 and plate 120, retains them with valve member 106 in a single rigid assembly (112).

Figure 2:
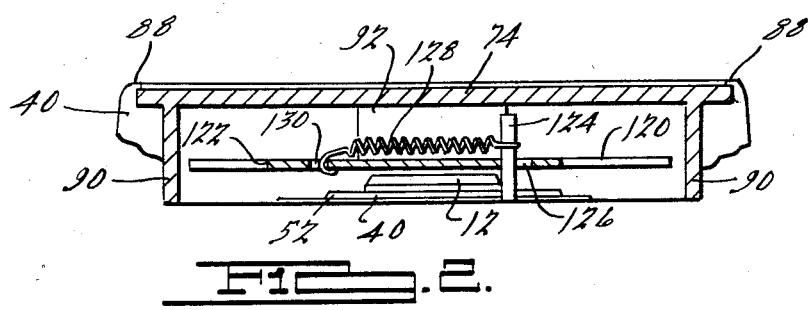
FIG. 2, is a cross-sectional view on an enlarged scale taken on line 2—2 of FIG. 1.

Plate 120, valve blade 114 and valve member 106 are permitted a small degree of rotational freedom with respect to cover assembly 38. This accomplished by an anchor pin 124 (refer to FIGS. 1 and 2) which is press fit within an aperture in hub 52 of cover 40, and which projects into fluid storage chamber 76 through a plane defined by plate 120. Pin 124 passes loosely through a crescent shaped aperture 126 within plate 120. Blade 114 and plate 120 are therefore permitted freedom of rotation with respect to cover assembly 38 to the extent of the major dimension aperture 126. In FIG. 1, plate 120 and blade 114 are illustrated in their first or counterclockwise limit of travel. When plate 120 and blade 114 are rotated clockwise until pin 124 abuts the righthand most end of slot 126, plate 120 and blade 114 are in their second or clockwise limit of travel.

A tension spring 128 disposed within fluid storage chamber 76 has one end hooked to pin 124 and the other end hooked through an aperture 130 within plate 120 to urge blade 114, plate 120 and valve member 106 into the first limit of travel (as illustrated).

The surface of plate 120 facing insert 84 operates as a second thrust or friction surface. The two friction surfaces are spaced from one another when valving element assembly 112 is in its first (as illustrated in FIG. 3) position. The spring action of the serpentine ends of blade 114 bias plate 120 as well as blade 114 and valve member 106 leftwardly away from shaft 12. Valve actuator means generally designated 132 are supplied in the form of an electromagnet comprising an inductor 134 wound within a spool 136 constructed of insulating material and disposed concentrically about shaft 12 intermediate flange 14 and portion 18, which is energized through a series connection of a voltage source 138 such as the vehicle's electrical system and a switch 140 which senses the temperature of a fluid associated with clutch 10. Switch 140 is preferably a standard coolant temperature sensing switch, but it is understood that it could also be a bimetal or other suitable ambient air temperature sensing device, fluid being defined herein as any relevant gas or liquid. Inductor 134 and spool 136 are fixedly attached to the vehicle engine or other structure by means of a suitable bracket 142.

Shaft 12 and plate 120 are constructed of steel or othere ferrous material. When switch 140 is closed and coil 134 energized, a magnetic circuit is established through shaft 12, across the space between insert 84 and plate 120, radially outwardly along plate 120 and back through the atmosphere to flange 14. Restated, a predetermined operating condition (coolant temperature) of an associated apparatus (vehicle engine) establishes a control signal (magnetic circuit). Clutch member 24, cover 40 and body 42 are constructed of zinc, aluminum or other suitable nonferrous material.

When switch 140 is closed, coil 134 is electrically energized. The magnetic field effected thereby is of sufficient intensity as to draw plate 120 rightwardly until it contacts insert 84 and the lefthand most surface of shaft 12. Such contact is designated, for the purposes of the present specification, as frictional engagement whereby during relative rotation between cover assembly 38 and clutch member 24, such engagement will tend to impart torque to plate 120 and thereby rotate it clockwise (see FIG. 1) from the first limit of travel to the second limit of travel. Definitionally, when energized, plate 120 is displaced axially rightwardly from its first position (illustrated) to a second position, in which it frictionally engages shaft 12 and insert 84. When coil 134 is energized and plate 120 and blade 114 are rotated to their second limit of travel, the end of blade 114 will uncover ports 118 and thus allow viscous fluid stored in chamber 76 to pass under the influence of centrifugal force into operating chamber 70. When switch 140 is opened, the magnetic field collapses and the spring function of blade 114 will return the central portion of blade 114 as well as plate 120 and valve member 106 to their first (illustrated) position. With the loss of frictional engagement with shaft 12, spring 128 will rotate plate 120, blade 114 and valve member 106 back to their first limit of travel, thereby closing drain ports 118 and preventing further passage of viscous fluid into to operating chamber 70.

Simultaneously, when valve member 106 is in its illustrated position, viscous fluid is free to travel radially inwardly through holes 68, apertures 78, recess 100, passageways 98, apertures 102, bores 108 and 110, and finally drain ports 104 into fluid storage chamber 76. When valve actuater means 132 is energized, valve member 106 is drawn rightwardly (as viewed in FIG. 3) until plate 120 contacts insert 84 to assume its second axial position. Once frictional engagement is made, valve member 106 will be rotated clockwise so that bores 108 and 110 will cease to register with apertures 102 and drain ports 104, respectively. This will block the flow of any additional fluid through the return passageway and, once all of the fluid contained within fluid storage chamber 76 has drained into operating chamber 70 through drain ports 118, will terminate the circulating flow and hold substantially all of the viscous fluid within the operating chamber for the transmission of maximum torque between the members 24 and 40. Once switch 140 is opened, the magnetic field collapses and the biasing effect of blade 114 will reposition valve member 106 leftwardly to reassume its first axial position. Such repositioning will cause the loss of frictional engagement and spring 128 will rotate valve member 106 counterclockwise to reassume its first limit of travel to reestablish fluid communication through return passage 111.

In operation, the pumping action caused by the sweeping of the radially outward most portion of clutch member 24 by annular recess 66 causes a localized region of increased pressure within the operating chamber 70. This pumping action is well-known in the art and is described in detail in U.S. Pat. No. 3,809,197, the specification of which is incorporated herein by reference. This increased pressure causes the viscous fluid in the operating chamber 70 to pass through holes 68 and into return passage apertures 78. As long as valve member 106 is in its illustrated position, the fluid will pump radially inwardly through return passage 111 and ultimately into fluid storage chamber 76.

As should be obvious to one of ordinary skill in the art, valving assembly 112 can be made to contact clutch member 24, shaft 12 or other associated structure. Accordingly, for the purposes of the claims, frictional engagement with a member includes engagement with any structure (such as shaft 12) rotating with such member.

Valving element assembly 112 has an additional advantage inherent in its structure. If clutch member 24 and cover assembly 38 become slightly skewed with respect to one another due to misassembly, wear or the like, and as a consequence, the planes defined by plate 120 and insert 84 are not parallel, operation of clutch 10 will remain unaffected because the serpentine construction of blade 114 will allow one end to expand slightly while the other end contracts slightly during the compression process without loss of function or seal.

It is to be understood that the invention has been described with reference to specific embodiments which provide the features and advantages previously described and that such specific embodiments are susceptible of modification, as will be apparent to those skilled in the art. For example, a fail safe operational arrangement can easily be incorporated within clutch 10 by reversing the orientation of ports 118, as well as apertures 102 and drain ports 104 with respect to blade 114 and valve member 106 so that in the first position of valving element assembly 112, ports 118 are opened and return passageway 111 is obstructed. When coil 134 is energized, assembly 112 and valve member 106 are moved to their second position to close ports 118 and open return passageway 111. In this manner, if coil 134 is not properly energized, switch or wire brakes, etc. for any reason, clutch 10 will automatically engage. Accordingly, the foregoing is not to be construed in a limiting sense.

I claim:
1. A viscous fluid clutch comprising:
   first and second members mounted for relative rotation about a common axis and defining cooperating shear surfaces forming an operating chamber therebetween;
   a return passageway operative to direct viscous fluid from a said operating chamber to a storage chamber as a function of relative rotation between said members; and
   valve means carried by one of said members and operable to frictionally engage the other of said members to effect modulation of fluid flowing within said return passageway.

2. The viscous clutch of claim 1, further comprising a pump operative to receive viscous fluid from said operating chamber and direct said fluid to said storage chamber as a function of relative rotation between said first and second members.

3. The viscous clutch of comprising:
   first and second members mounted for relative rotation about a common axis and defining cooperating shear surfaces forming an operating chamber therebetween;
   a return passageway operative to direct viscous fluid from said operating chamber to a storage chamber as a function of relative rotation between said members; and
   valve means operable to frictionally engage one of said members to effect modulation of fluid flowing within said return passageway, said valve means comprising a valving element carried by one of said members for limited relative rotational displacement with respect thereto.

4. The visous clutch of claim 1, wherein said valving element is disposed concentrically with respect to said first and second members.

5. The viscous clutch of claim 3, further comprising actuator means operative to axially displace said valving element to effect said engagement.

6. The viscous clutch of claim 5, wherein said actuator means comprises an electromagnet operative to establish a magnetic circuit which passes through ferrous metal within said valving element.

7. The viscous clutch of claim 6, wherein said electromagnet comprises an inductor disposed concentrically about said axis which is electrically energized as a function of the temperature of a fluid associated with said clutch.

8. The viscous clutch of claim 5 wherein said actuator means is operative to axially displace said valving element between a first, nonengaging position and a second, frictionally engaging position.

9. The viscous clutch of claim 8, further comprising additional biasing means operative to urge said valving element into said first position.

10. The viscous clutch of claim 9, wherein said additional biasing means is further operative to compensate for relative misallignment of said first and second members.

11. A viscous fluid clutch comprising:
a first member secured for rotation with a shaft;
a second member rotatably disposed on said shaft relative to said first member;
shear surfaces disposed on said first and second members and forming an operating chamber therebetween;
a fluid storage chamber disposed adjacent said operating chamber;
a pump operative to displace fluid from said operating chamber to said storage chamber through a return passageway as a function of relative rotation between said members;
at least one drain port interconnecting said chambers for selective fluid communication therebetween; and
valve means carried by one of said members and operable to frictionally engage the other of said members to effect modulation of fluid flowing within said return passageway.

12. A viscous fluid clutch comprising:
a first member secured for rotation with a shaft;
a second member rotatably disposed on said shaft relative to said first member;
shear surfaces disposed on said first and second members and forming an operating chamber therebetween;
a fluid storage chamber disposed adjacent said operating chamber;
a pump operative to displace fluid from said operating chamber to said storage chamber through a return passageway as a function of relative rotation between said members;
at least one drain port interconnecting said chambers for selective fluid communication therebetween; and
valve means operable to frictionally engage one of said members to effect modulation of fluid flowing within said return passageway, said valve means comprising a valving element carried by one of said members for limited relative rotational displacement with respect thereto.

13. The viscous clutch of claim 12, wherein said valving element is disposed concentrically with respect to said first and second members.

14. The viscous clutch of claim 12, further comprising actuator means operative to axially displace said valving element to effect said engagement.

15. The viscous clutch of claim 14, wherein said actuator means comprises an electromagnet operative to establish a magnetic circuit which passes through ferrous metal within said valving element.

16. The viscous clutch of claim 15, wherein said electromagnet comprises an inductor disposed concentrically about said axis which is electrically energized as a function of the temperature of a fluid associated with said clutch.

17. The viscous clutch of claim 14, wherein said actuator means is operative to axially displace said valving element between a first nonengaging position and a second, frictionally engaging position.

18. A viscous fluid clutch comprising:
first and second members mounted for relative rotation about a common axis and defining cooperating shear surfaces forming an operating chamber therebetween;
a return passageway operative to direct viscous fluid from said operating chamber to a storage chamber as a function of relative rotation between said members;
valve means operable to frictionally engage one of said members to effect modulation of fluid flowing within said return passageway, said valve means comprising a valving element carried by one of said members for relative rotational displacement with respect thereto;
means operative to limit said relative rotational displacement of said valving element between a first limit of travel in which viscous fluid flow through said return passageway is substantially unobstructed, and a second limit of travel in which said return passageway is substantially closed;
at least one drain port for fluidly interconnecting said fluid storage chamber and said operating chamber; and
means operative to obstruct said port when said valving element is in said first limit of travel and to open said port when said valving element is in said second limit of travel.

* * * * *